Aug. 18, 1936.    J. J. AULL    2,051,124

VALVE

Filed Jan. 22, 1934    2 Sheets-Sheet 1

Inventor
JEROME J. AULL
BY
Toulmin & Toulmin
Attorneys

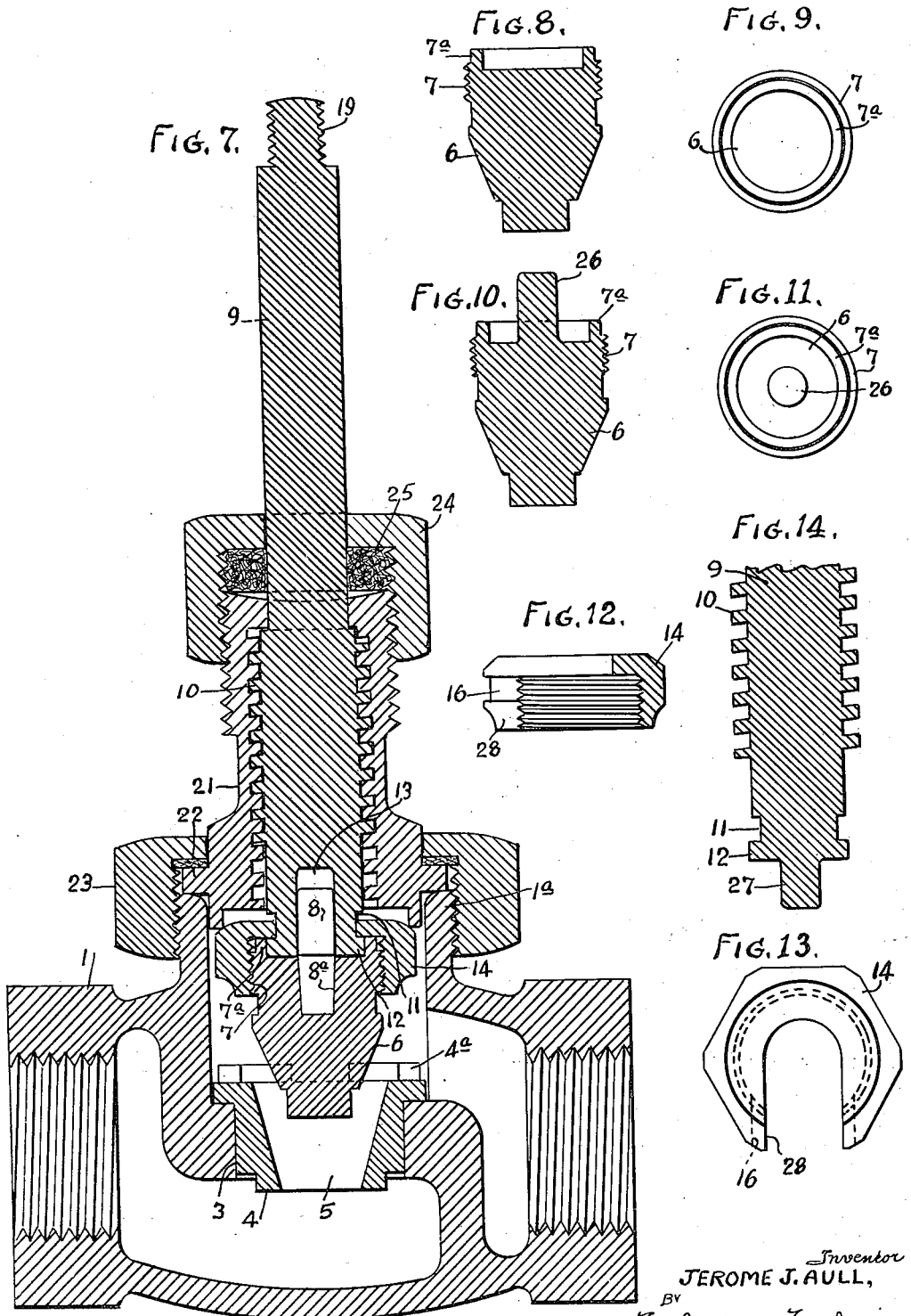

Patented Aug. 18, 1936

2,051,124

UNITED STATES PATENT OFFICE 2,051,124

VALVE

Jerome J. Aull, Cincinnati, Ohio, assignor to The Lunkenheimer Company, Cincinnati, Ohio, a corporation of Ohio Application January 22, 1934, Serial No. 707,656

1 Claim. (Cl. 287—91)

This invention relates to improvements in valves, and has for its object to provide, in connection with the valve structure, a valve member, a valve stem, and means for connecting the valve member to the valve stem so the two may be rotated with respect to each other but cannot be moved laterally or longitudinally.

It is an object of this invention to provide, in connection with a valve structure, a valve member having a sleeve thereon to provide a seat for a valve stem so that the valve member cannot be moved laterally with respect to the valve stem.

It is also an object to provide, in connection with a valve member and a valve stem, a pin for holding the two in longitudinal alignment. This pin may be integral with the valve member, the valve stem, or may be formed of a separate piece of material.

These and other objects and advantages will appear from the following description taken in connection with the drawings.

Referring to the drawings:

Figure 7 is a vertical section through the whole valve mechanism, including the valve casing.

Figure 8 is a vertical section through another form of valve member.

Figure 9 is a top plan view of the valve member shown in Figure 8.

Figure 10 is a vertical section through still another form of valve member.

Figure 11 is a top plan view of the valve member shown in Figure 10.

Figure 12 shows in vertical section a modified form of locking nut.

Figure 13 is a top plan view of the nut shown in Figure 12.

Figure 14 shows in section the lower end of a modified form of valve stem.

Figure 1:
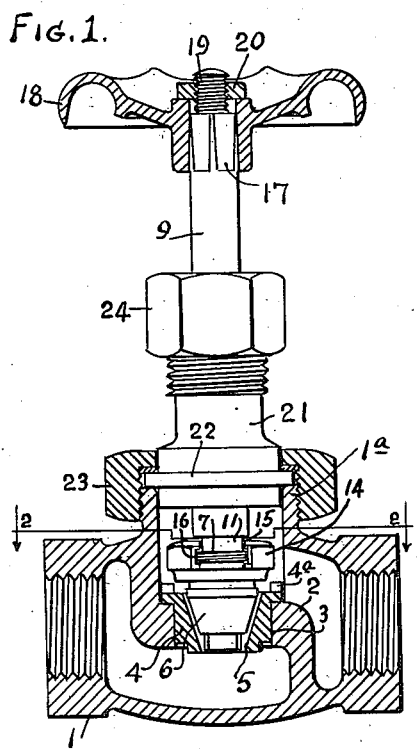
Figure 1 is a view showing in elevation the valve member supported by a bonnet which is connected to a valve casing, shown in section.
Figure 2:
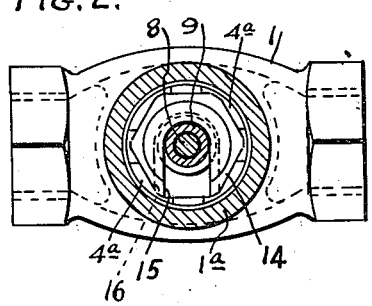
Figure 2 is a section on the line 2—2 of Figure 1.
Figure 3:
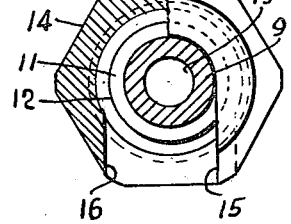
Figure 3 is a top plan view of a locking nut with the lower end of the valve stem shown in section, and one side of the nut in section.
Figure 4:
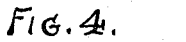
Figure 4 shows in elevation the valve assembly with the connection between the valve member and the valve stem in section.

The numeral 1 is used to designate a valve casing, which has extending therethrough the usual passageway across which there is a partition 2. In this partition is a hole 3 adapted to receive a seat ring 4, which has a cone-shaped hole 5 therein forming a part of the passageway through which the liquid passes through the casing. This cone-shaped hole 5 is in line with an opening in the side of the valve casing surrounded by a threaded neck 1a. On top of the seat ring 4 is a plurality of lugs 4a, adapted to be engaged by some tool for manipulating the ring (Figure 1).

Figure 6:
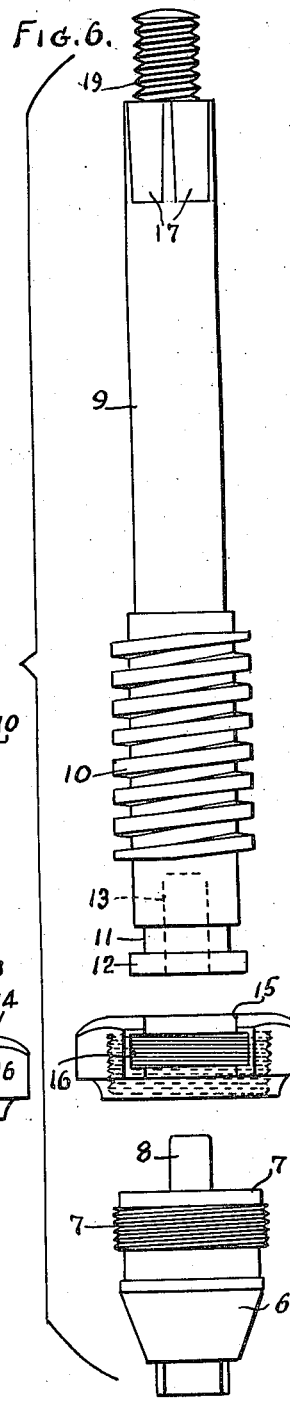
Figure 6 shows the valve stem, the valve member and the locking nut detached.

The cone-shaped hole 5 is adapted to be closed by a valve member (Figures 6 and 7) which has thereon a cone-shaped part 6 for fitting in the hole 5, and a cylindrical threaded part 7. The free end of the cylindrical threaded part 7 has an annular axially extending sleeve 7a, which forms a socket for seating one end of the valve stem. In the valve member, substantially in the center of the socket formed by the sleeve 7a, is a hole 8a adapted to receive a metal pin 8, which projects into a hole 13 in one end of the valve stem 9. This valve stem has thereon the usual threads 10 for engagement with some member for moving the valve stem longitudinally upon rotation.

Around the lower end of the valve stem is a groove 11, which forms on the end of the valve stem a head 12 adapted to fit in the socket formed by the sleeve 7a. The valve stem and the valve member are held assembled by means of a valve locknut 14, which is circular in shape and has on one side a slot 15 beside which are grooves 16. The notch 15 is to receive the neck part of the valve stem formed by the groove 11, while the grooves 16 receive the head 12 of the valve stem. This lock member is threaded upon the valve member and when so threaded holds the valve stem and the valve member against movement longitudinally and laterally.

The valve stem, adjacent its upper end, is squared, as indicated by the numeral 17, to receive a handle member 18 which has therein a square hole for receiving the square end of the valve stem. The extreme upper end of the valve stem is threaded at 19 to receive a nut 20 for holding the handle upon the stem. The valve stem is threaded in the usual bonnet 21, which has adjacent its lower end a radially extending flange 22 adapted to rest upon the upper surface of the neck 1a. The bonnet is held upon the valve casing by means of a cap nut 23, threaded upon the neck 1a and engaging the upper surface of the flange 22.

Figure 5:
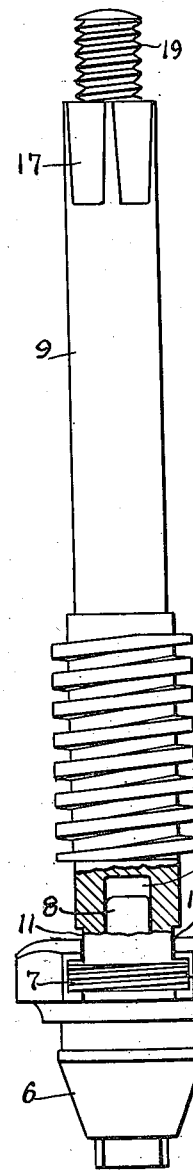
Figure 5 is a vertical section through the valve member showing a guide pin.
Figure 5:
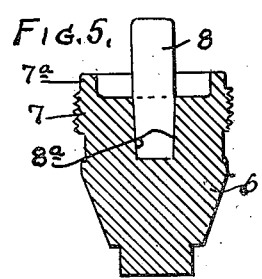

On the upper end of the bonnet and fitting around the stem is a nut 24, which provides with the upper end of the bonnet space for packing 25. The modified valve member, as shown in Figure 8, has no guide pin formed thereon and is provided with no hole for receiving such a pin. The modified valve member shown in Figure 10 has provided thereon an integral pin 26 located similarly to pin 8 and adapted to serve the same purpose. Instead of having a pin on the valve member the lower end of the valve stem may be provided with a pin 27, this modification being shown in Figure 14. This pin 27 will project into a hole 8a such as that shown in the valve member of Figure 5.

In Figures 12 and 13 the locknut has a slot 28 which extends entirely through the nut, from top to bottom. The upper part of the slot will receive the part of the valve stem above the head, while the lower part of the slot will receive a pin, such as 27, shown at the lower end of the valve stem in Figure 14.

In assembling the parts the locknut is placed upon the lower end of the valve stem, with the upper part of the nut in the groove 11 and resting upon the top of the head 12. The valve member is then threaded into the locknut, and when completely threaded into the nut the sleeve 7a surrounds the head on the lower end of the valve stem, and the upper part of the locknut will rest upon the top of the sleeve 7a slightly clear of the head 12, as shown in Figure 7.

At this time the pin 8, having its lower end inserted in a hole in the valve member, projects into the hole 13 in the lower end of the valve stem. This connection between the valve stem and the valve member is such that the two may rotate with relation to each other but cannot move longitudinally, laterally nor move out of alignment one with the other. This connection also provides facilities by which valve members of various forms may be attached to the same valve stem. The removable nature of the plug 4 makes it possible to replace one plug that is worn with another that is not worn, or by a plug having a smaller opening therein so that the cone-shaped hole in the plug may be varied in accordance with the size of the valve member, or the size of the valve member may be changed to correspond to the size of the opening or hole in the plug. When any part becomes worn it may be replaced by another so that this valve structure may be maintained in substantially perfect condition after having been used many years.

I desire to comprehend within my invention such modifications as may be embraced within my claim and the scope of my invention.

Having thus fully described my invention, what I claim as new and desire to secure by Letters Patent, is:

In a valve, a stem with a hole in one end thereof, said end being grooved, a valve member with a freely slidable pin on the top thereof to enter said hole and a slotted retaining nut threaded on the valve member and slidably engaging the grooved stem to connect the valve thereto after said pin has entered the hole therein whereby said valve member and said stem are connected and axially aligned.

JEROME J. AULL.